United States Patent [19]

Schenk

[11] 4,226,009
[45] Oct. 7, 1980

[54] RECEPTACLE RETAINER

[75] Inventor: Peter Schenk, West Islip, N.Y.

[73] Assignee: Dzus Fastener Co., Inc., West Islip, N.Y.

[21] Appl. No.: 892,900

[22] Filed: Apr. 3, 1978

[51] Int. Cl.² .................................................. A44B 17/00
[52] U.S. Cl. ...................................... 24/221 R; 24/213 B; 85/5 P
[58] Field of Search ............. 24/221 R, 213 B, 221 A; 85/5 P

[56] References Cited

U.S. PATENT DOCUMENTS

| | | | |
|---|---|---|---|
| 1,768,505 | 6/1930 | Carr | 24/221 A |
| 2,283,526 | 5/1942 | Albin | 24/221 A |
| 3,059,299 | 10/1962 | Sarafinas | 24/213 B |
| 3,417,442 | 12/1968 | Smith | 24/221 R |
| 3,600,018 | 8/1971 | Dzus | 24/221 |
| 3,649,059 | 3/1972 | Davidson | 24/221 R |

FOREIGN PATENT DOCUMENTS

| | | | |
|---|---|---|---|
| 143545 | 9/1951 | Australia | 241/213 B |
| 952576 | 11/1956 | Fed. Rep. of Germany | 24/213 B |
| 1028266 | 5/1953 | France | 24/213 B |
| 1343378 | 10/1963 | France | 24/213 B |
| 648563 | 1/1951 | United Kingdom | 24/221 R |

Primary Examiner—J. Franklin Foss
Attorney, Agent, or Firm—Kane, Dalsimer, Kane, Sullivan & Kurucz

[57] ABSTRACT

A receptacle retainer for holding a receptacle to one of two members to be fastened in position to be coupled with a stud mounted on the other of the two members to form a fastener for holding the two members together. The retainer includes structure for engaging the surfaces surrounding an aperture in the one member so as to be fixed in position while permitting passage of a portion of the stud therethrough. A body portion of the retainer extends from the one member and is adapted to retain the receptacle thereon. Retention of the receptacle retainer is of the type which permits the receptacle to be held with limited free movement on the one member so as to be retained in the proximity of the aperture thereon and in position to be freely moved into fastened interengagement with the stud when the stud and receptacle are coupled to hold the two members together.

11 Claims, 5 Drawing Figures

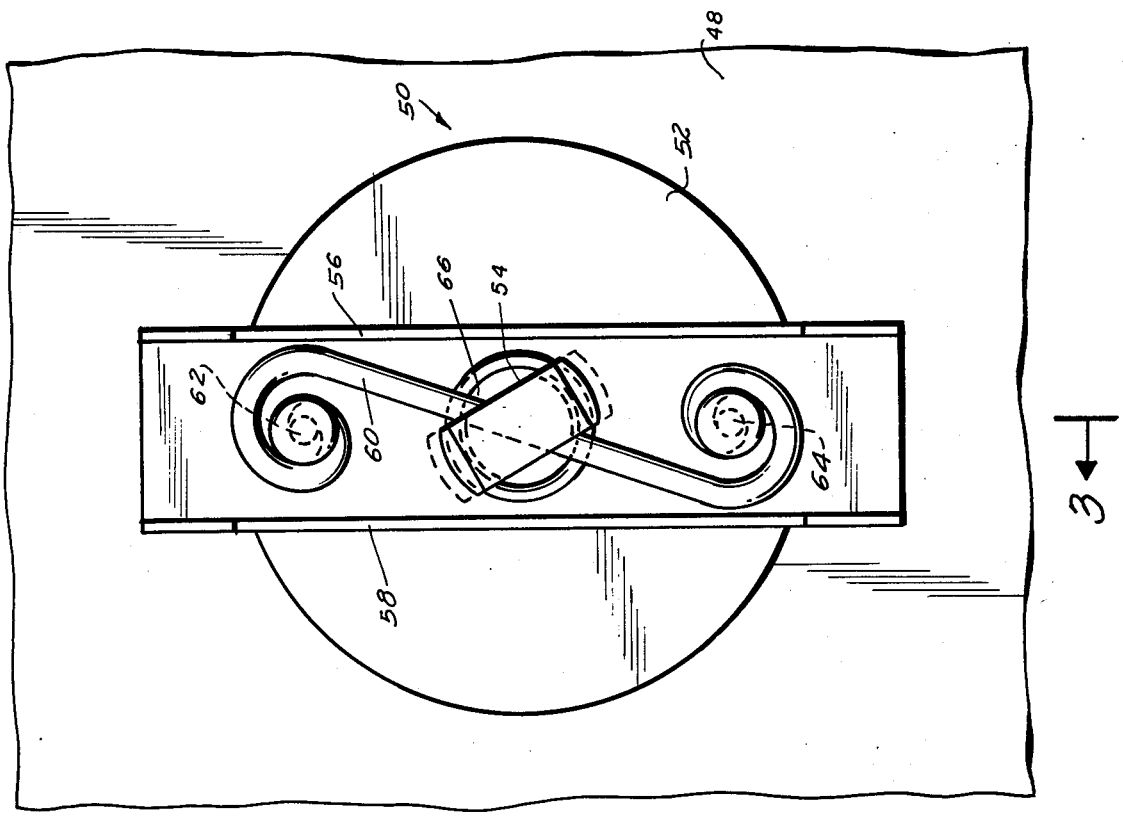
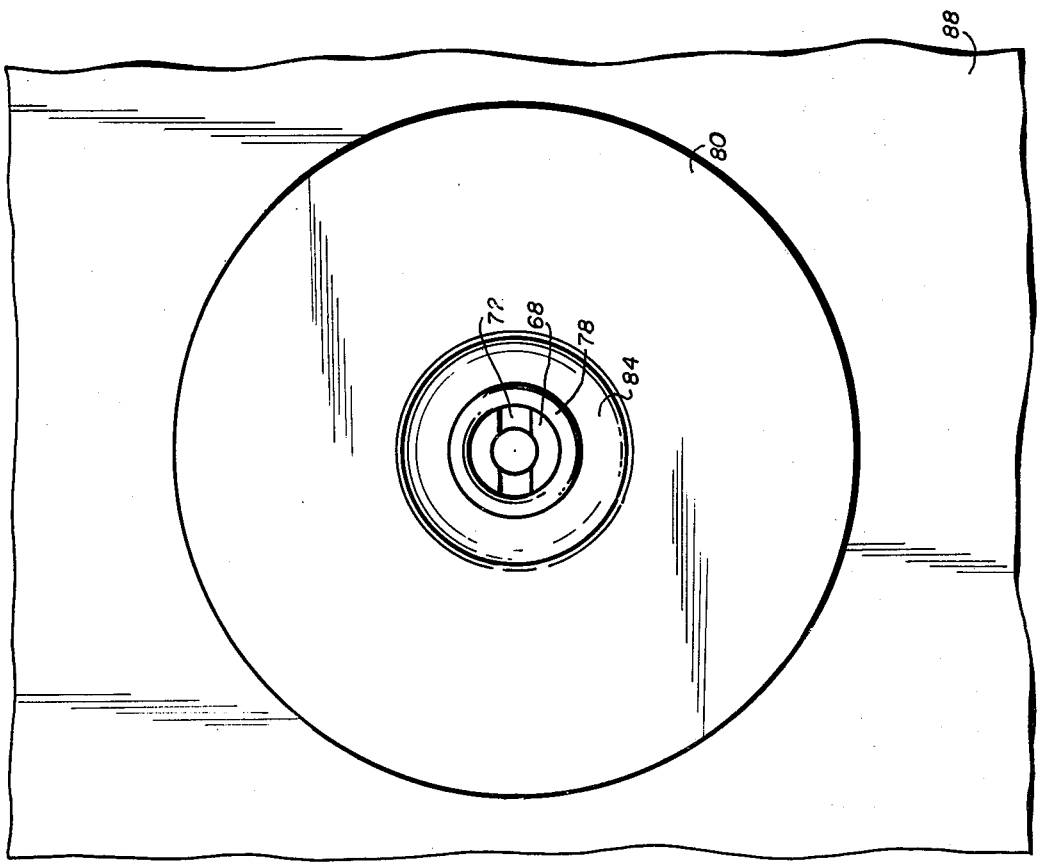

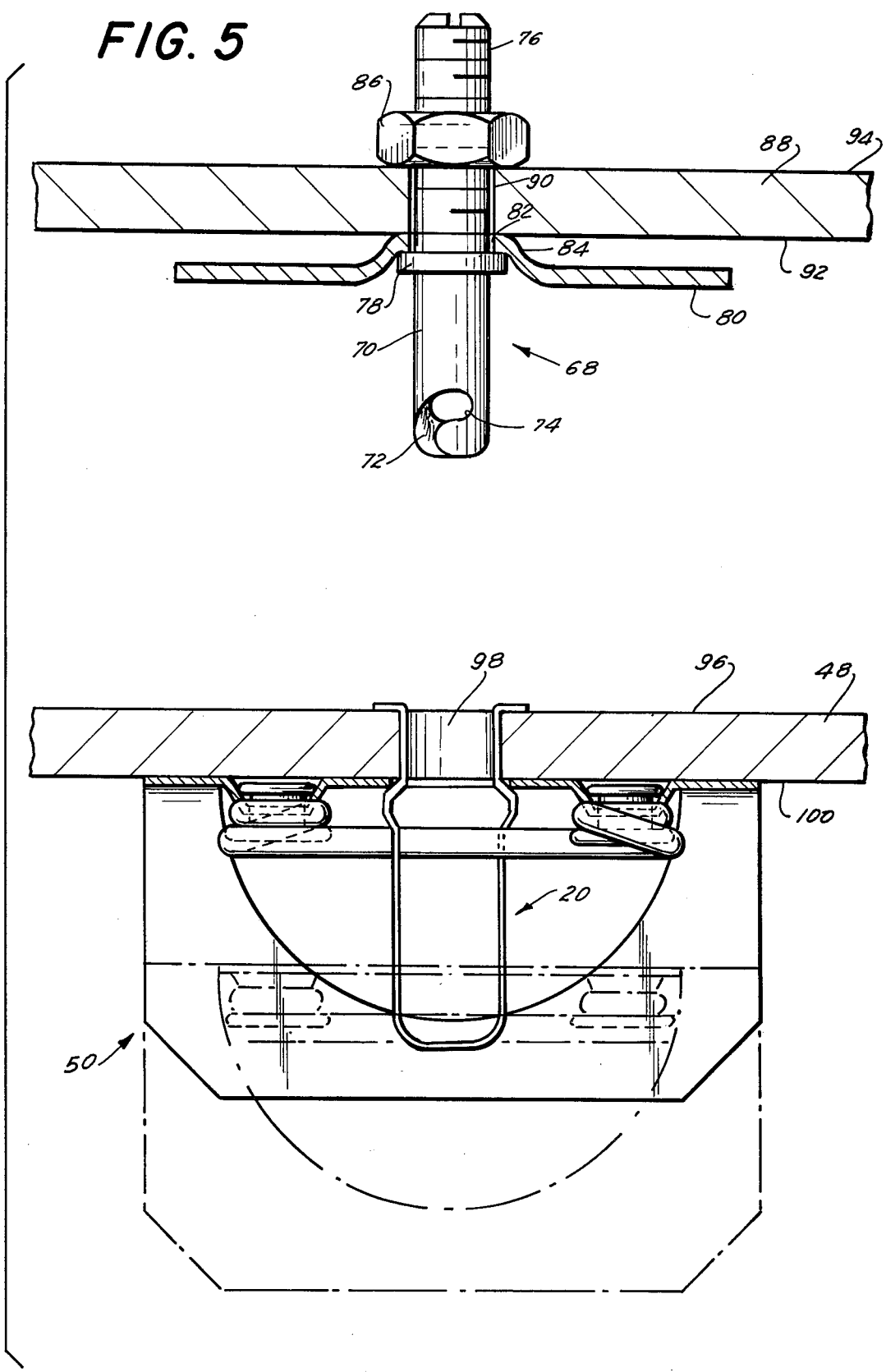

RECEPTACLE RETAINER

BACKGROUND OF THE INVENTION

Quarter-turn fastener assemblies are quite common and are used in a variety of different environments. The principal utilization and advantage of the structure is for the purpose of quick fastening and unfastening of component parts such as panels or other structural elements. The advantages obtained by the quick opening and closing feature of the quarter-turn fastener include ease of access to enclosures as well as fast assembly and disassembly.

One common difficulty with fasteners of the quarter-turn type as well as other types, particularly when they are often opened and closed and when speed of assembly is of importance is the problem of what to do with the half of the fastener and stud assembly which is not mounted in fixed position. During the unfastening operation, the removed fastener part, for example the receptacle, must be put aside to permit use of both of the operator's hands. This results in time loss in relocating the fastener half or possibly loss of the component so that when it is time to reassemble the fastener, it is difficult or impossible to find the missing part. The cost factor naturally come into consideration.

For example, one environment where this occurs is in automobile manufacture where various panels on the vehicle are interconnected by fasteners such as a quarter-turn fastener for quick opening and closing. The operator must be able to use both hands in shifting and handling the various components and it is a great inconvenience to have to hold a fastener part while placing the panels or other elements of structure in the desired position for fastening. When a fastener part such as a receptacle is set aside, the natural difficulty of locating the fastener half for completing the fastening operation occurs including the danger of misplacing the fastener and of holding the panel or elements of structure in the desired position so that the fastener elements are aligned for the fastening operation. This difficulty in handling and utilizing the fastener results in undesirable time loss and increased cost.

Accordingly, there is a need for a receptacle retainer in a receptacle and stud type fastener arrangement for holding the receptacle in the proximate position on one member to be fastener so that it can be easily coupled with the other fastener element in a quick and efficient manner. Naturally the retainer itself should be inexpensive, simple in construction and easy to install.

SUMMARY OF THE INVENTION

With the above background in mind, it is among the primary objectives of the present invention to provide a receptacle retainer of simple, low cost construction which can be easily assembled with a conventional type of fastener assembly and with conventional type of members to be fastened such as panel members. The retainer is formed of a simple U-shaped spring steel construction with flanged free ends and a projection intermediate the ends of each leg spaced from the flange so that the receptacle can be snapped into position in the aperture of a member to be fastened with the member captured between the projection and flange of each leg.

The retainer is provided with structure to capture a receptacle for a stud to retain the receptacle in the proximity of the member on which the retainer is mounted so that the receptacle can be quickly and easily grasped and coupled with a stud mounted on the other member to be fastened when the stud is passed through the first member's aperture. The retainer is designed so that it will not interfere with insertion and removal of the stud or coupling of the stud with the receptacle. When the stud and receptacle are unfastened, the receptacle can freely be removed from the stud to permit separation of the two members with the receptacle still on the retainer in general proximity to the aperture in which the retainer is mounted.

The retainer is designed for use with conventional types of fasteners such as quarter-turn stud and receptacle assemblies with a spring cam follower on the receptacle and a spiral cam slot in the stud or vice versa. A quarter-turn of relative movement between the receptacle and stud accomplishes the fastening and unfastening action. Naturally other types of common fastener assemblies can also be employed with the retainer acting to hold the receptacle in position for quick and easy fastening and unfastening action with respect to the stud member.

One convenient type of fastener assembly for which the retainer is adapted for use in a fastener and stud assembly commonly used in the automotive industry to fasten and unfasten adjacent panel members. The receptacle is in the form of an enlarged disc-shaped base for engagement with the surface of one panel. Mounted on the base is a spring which forms a cam follower by passing diametrically across an opening in the base is positioned for coupling with a spiral cam slot in the end of a cylindrically shaped stud passed through the opening in the base. Projecting rearwardly from the base are two opposed upstanding wings which can be grasped and rotated thereby rotating the receptacle and facilitating the quarter-turn fastening and unfastening operation.

The stud is designed to be mounted to the other of the two panels to be fastened and can be mounted in conventional fashion such as by a threaded nut and a threaded stud end extended through a hole in the other member. The stud also includes an enlarged lateral projection for engagement with an adjacent surface of a panel member. The enlarged surfaces of the base of the receptacle and the projection on the stud form a combined enlarged surface area for engagement with the panels being fastened and for spreading the fastening load over a large area. In a quarter-turn fastener as well as other types of fasteners, this structure results in a highly vibration resistant mounting. This naturally is particularly desirable in the automotive field.

In any event the simple one piece retainer is inexpensively manufactured and is quick and easy to install on a panel or other supporting structure without the need of additional installation components. The retainer acts to capture or cage an element of a fastener assembly such as a receptacle within the proximity of the location where it is to be coupled with the other component of the fastener assembly. This is accomplished without interfering with the fastening and unfastening action and in fact enhancing that action by providing ready access to the loose member of the fastener assembly particularly when the other of the two members is mounted in rigid and fixed position.

In summary, a receptacle retainer is provided for holding a receptacle to one of two members to be fastened in position to be coupled with a stud mounted on the other of the two members to form a fastener for holding the two members together. The retainer includes means for engaging the surfaces surrounding an aperture in the one member so as to be fixed in position while permitting passage of a portion of the stud therethrough. A body portion of the retainer extends from the one member and is adapted to retain the receptacle thereon. The retention means on the retainer permits the receptacle to be held with limited free movement on the one member so as to be retained in the proximity of the aperture therein and in position to be freely moved into fastened interengagement with the stud when the stud and receptacle are coupled to hold the two members together.

With the above objectives among others in mind, reference is made to the attached drawings.

BRIEF DESCRIPTION OF THE DRAWINGS

In the drawings:

FIG. 1 is a plan view of a fragmentary portion of a panel to be fastened with a stud mounted in fixed position thereon;

FIG. 2 is a fragmentary plan view of two members to be fastened with a stud mounted to one of the members and a receptacle mounted to the other of the members with the retainer of the invention coupling the receptacle to the second member;

FIG. 5 is an exploded sectional view thereof with the stud and one panel disassembled from the receptacle, retainer and other panel and in phantom the receptacle shown in the freely shifted position still held by the retainer in proximity to the panel on which it is mounted.

DETAILED DESCRIPTION

Figure 3:
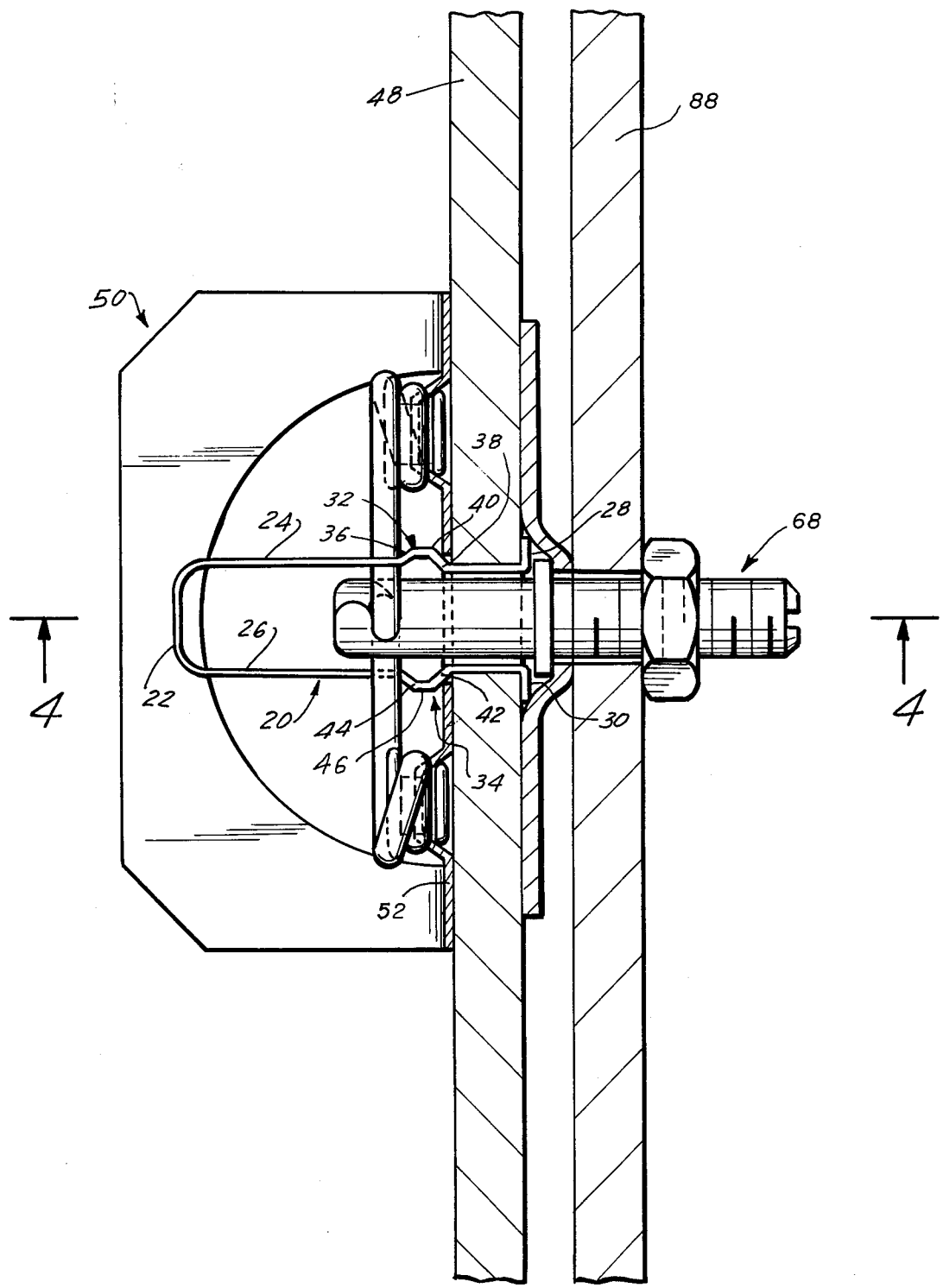
FIG. 3 is a sectional elevation view thereof taken along the plane of line 3—3 of FIG. 2.

The receptacle retainer 20 is a single piece of somewhat rigid and some resilient material such as spring steel or a hard plastic material. It is formed of a single piece of material of U-shaped configuration and formed of a closed end or base 22 and a pair of opposing identical legs 24 and 26 extending therefrom. The base 22 and legs 24 and 26 are narrow in cross section and of relatively narrow width. Therefore, the legs 24 and 26 can be resiliently shifted toward one another and when released will return to the relaxed open and separated position.

At the free end of leg 24 is an outwardly extending flange 28 and a similar outwardly extending flange 30 is at the free end of the other leg 26. The flanges 28 and 30 extend in opposite directions.

Spaced from the flanged free ends of the legs are a pair of opposing aligned projections. Projection 32 is located on leg 24 and projection 34 is located on leg 26. Each projection can be formed in a convenient manner such as by deforming the leg outward so that the projection forms a shoulder on the outer side of the leg. In the depicted form, the projection 34 and projection 32 are both formed in the same manner. Projection 32 has a pair of angularly outward extending portions 36 and 38 directed outwardly and toward one another and adjoining with an integrally formed flat portion 40 substantially parallel with the remainder of leg 24 and spaced outwardly therefrom.

Similarly, projection 34 has a pair of angularly extending portions 42 and 44 extending outwardly and toward one another and formed integrally with a flat outer portion 46 substantially parallel to the remainder of leg 26.

The distance between projection 32 and flange 28 as well as between projection 34 and flange 30 is predetermined depending upon the thickness of the member on which the retainer is to be mounted.

In the depicted embodiment, receptacle retainer 20 is mounted to a panel 48 which may be a typical metal panel used in automobile construction. The retainer is also coupled to a receptacle 50 of a fastener assembly. The receptacle 50 includes an enlarged disc-shaped base 52 with a central opening 54 therein. Integrally formed with the base and extending upwardly therefrom is a pair of opposed parallel wings 56 and 58. The wings 56 and 58 form a gripping surface for facilitating rotation of receptacle 50 during use. Mounted on the base between the wings is a cam follower 60 in the form of a spring steel wire with one curled end mounted to the base rivet 62 and the other curled end mounted to the base by a rivet 64. The rivets are conventional fastening members. The cam follower spring 60 is positioned so that its central portion 66 extends diametrically across opening 54 in position for engagement with a stud and for being caged or captured with limited movement within U-shaped retainer 20. The enlarged undersurface of the disc-shaped base 52 forms a bearing surface against one side of member 48 and this enlarged surface aids in distributing the fastening load over a large area.

Receptacle 50 is designed for coupling and uncoupling with a companion stud 68. The stud is in the form of a substantially cylindrical elongated member with a forward shank portion 70 terminating in a spiral cam slot 72. A locking detent 74 is in the inner end of the spiral cam slot. The opposite end portion of stud 68 has a threaded outer surface 76. Intermediate the threaded surface 76 and the shank portion 70 is an annular flange 78. Adjacent to the flange on the threaded end of the stud 68 is an enlarged annular laterally extending disc 80. A central aperture 82 is in the disc portion through which the stud passes and the portion of the disc 80 adjacent to aperture 82 is convoluted to form a raised portion 84. A conventional threaded nut 86 is used to engage with threaded surface 76 in mounting of the stud.

In assembly, stud 68 is mounted to a conventional panel 88 having a hole 90 therethrough. The stud is mounted by extending threaded end 78 through hole 90 from side 92 of panel 88 until inner portion 84 of disc 80 engages with surface 92 and captured between surface 92 and the inner side of annular flange 78. Nut 86 is then threaded onto threaded end 76 until it comes into tight engagement with the other surface 94 of panel 88. In this manner the stud is mounted in fixed position. It will be noted that the outer portion of disc 80 is spaced from surface 92 so that it extends beyond annular flange 78 and in position for interengagement with the adjacent surface 96 of panel 48 to be coupled with panel 88.

Receptacle 50 is loosely coupled with panel 48 by means of retainer 20. Initially spring cam follower 60 is extended between legs 24 and 26 of the retainer and the resilient retainer legs are then depressed toward one another and the open end of retainer 20 is extended through opening 98 in panel 48. The extension continues until flanged ends 28 and 30 are fully through aperture 98 whereupon release of the legs will permit them to tend to return to the relaxed position so that flanges 28 and 30 engage with surface 96 surrounding aperture 98. In this position, projections 32 and 34 are in position for engagement with the opposite surface 100 of panel 48 thereby fixing the retainer in position on panel 48. In this condition, receptacle 50 is loosely captured within U-shaped retainer 20 with freedom of movement being possible between engagement of cam follower spring 60 with surface 100 of the panel and with the inner surfaces the legs and base of retainer 20 as shown in phantom in FIG. 5.

Figure 4:
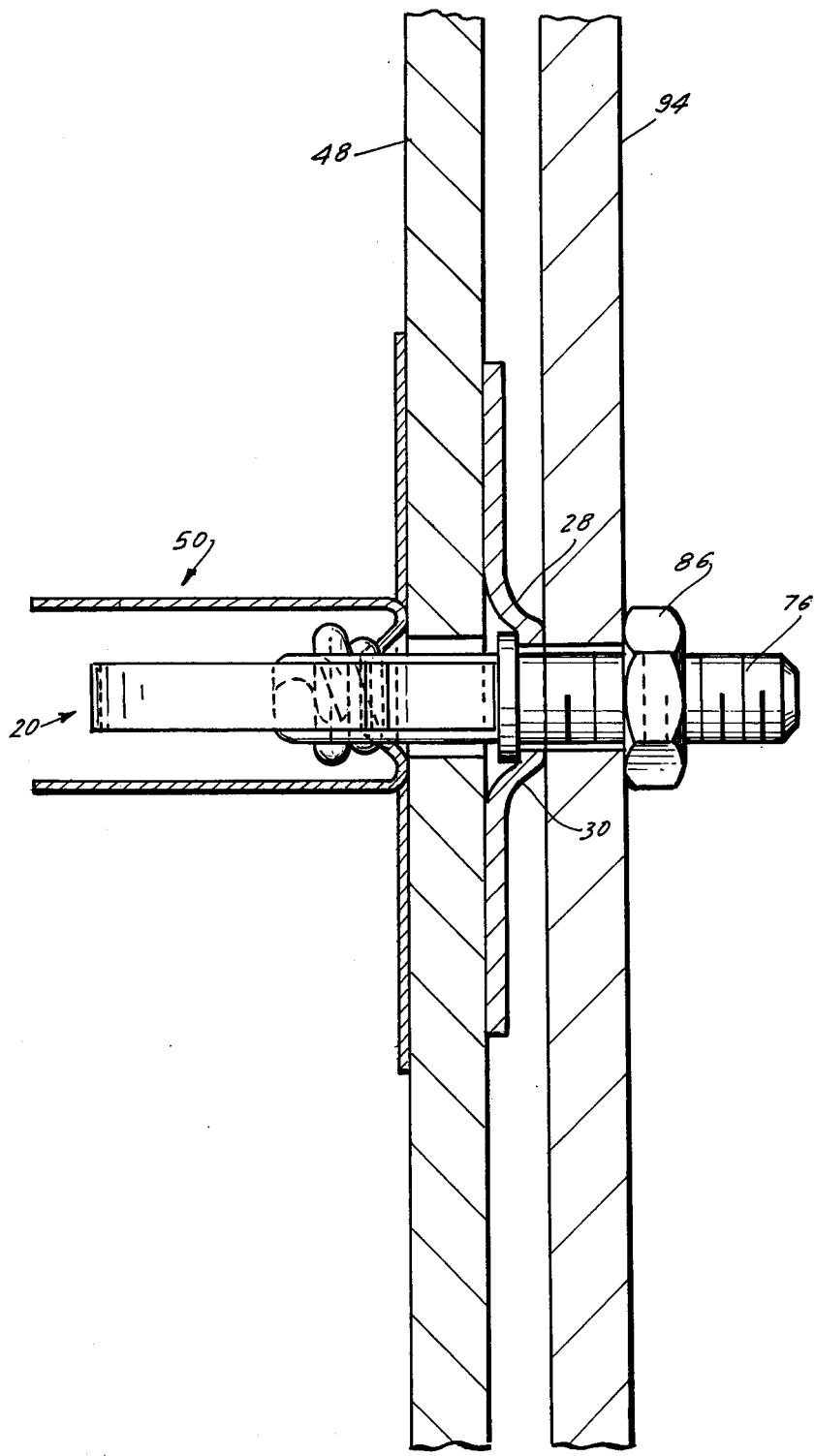
FIG. 4 is a sectional end view thereof taken along the plane of line 4—4 of FIG. 3.

In this condition, the panels are ready to be fastened by the interengagement between the stud 68 and receptacle 50. Stud 68 is fixed in position on panel 88 and receptacle is held in a caged proximal position with respect to panel 48. Assembly can be quickly and efficiently accomplished by bringing the panels 48 and 88 into close alignment so that shank portion 70 of stud 68 can pass through aperture 98 and opening 54 and engage with camn follower spring 60. Thereafter, rotation of the receptacle by grasping wings 56 and 58 and rotating the receptacle 90 degrees will pass cam follower spring 60 along cam slot 72 until it resiliently seats in locking detent 74. This draws the panels into tight interengagement by use of the bearing surfaces of the fastener, the enlarged undersurface of disc 80 in engagement with surface 96 of panel 48 and the enlarged disc-shaped base 52 of the receptacle 50 in engagement with the opposite surface 100 of panel 48. This large surface area interengagement distributes the load applied by the fastener in holding the panels together. This locked condition is depicted clearly in FIGS. 3 and 4.

To unlock the fastener, the wings 56 and 58 of receptacle 50 are grasped and rotated in the opposite direction approximately 90 degrees or one quarter-turn which will shift spring cam follower 60 out of detent 74 and out of cam slot 72 whereupon the stud can be removed from aperture 98 and opening 54 and the receptacle released to be held in the loose proximal vicinity of panel 48 by means of retainer 20. The panels 92 and 88 can then be separated. Refastening can be accomplished in the same quick and efficient manner as described above.

The fastener of the present invention is adapted for many environments such as in the automotive field where highly vibration resistant mountings are desirable as well as fasteners which can be operated in a quick and efficient manner and where it is convenient and desirable to have a loose fastener component in a readily available and accessible position and condition. Also, the fastener of the present invention is useful in the automotive field as well as other related fields where paneling is being interengaged in order to distribute loads applied by fastening devices over a larger area to avoid damage and distortion of the paneling.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A receptacle retainer for holding a receptacle to one of two members to be fastened in position to be coupled with a stud mounted on the other of the two members to form a fastener for holding the two members together, the retainer comprising; means for engaging the surfaces surrounding an aperture in the one member so as to be fixed in position while permitting passage of a portion of the stud therethrough, a projecting leg portion of the retainer extending from the one member when the retainer is fixed in position on the one member and the projecting leg portion adapted to engage and hold the receptacle on the retainer and one member, the projecting leg portion holding the receptacle with limited free movement of the receptacle on the one member including axial and rotational movement so as to be retained in the proximity of the aperture therein and in position to be freely moved and rotated into fastened interengagement with the stud and fully seated against the one member free of interference with the retainer without the necessity of disengaging the retainer from the one member when the stud and receptacle are coupled to hold the two members together.

2. The invention in accordance with claim 1 wherein the projecting leg portion of the receptacle retainer is substantially U-shaped in configuration forming a base and two legs extending therefrom, each leg having a free end, said means for engaging said surfaces including a flange on the free end of each leg, each leg having a shoulder intermediate its ends spaced from the flange so that when the receptacle retainer is positioned in the aperture in the one member the flange and shoulder of each leg will engage opposing sides of the one member respectively in the area surrounding the aperture thereby mounting the retainer in the aperture with the base spaced a predetermined distance from the surface of one side of the one member.

3. The invention in accordance with claim 2 wherein the flange extends perpendicularly outward from the end of the leg and each shoulder is formed by deforming an intermediate portion of the leg outward so as to provide a flat central portion connected to two oppositely and inwardly extending angular portions integrally formed with the remainder of the leg.

4. The invention in accordance with claim 2 wherein the retainer is formed of spring steel material.

5. The invention in accordance with claim 1 wherein the retainer is formed of resilient material, the resilient nature of the legs of the retainer facilitating the mounting of the retainer by permitting the legs to be directed inwardly toward one another so that they can be extended through the aperture in the one member until the flanged ends are on one side of the one member and the projections of the legs are on the other side of the one member whereupon release of the legs will snap the legs into fixed position in the aperture in the one member.

6. The invention in accordance with claim 1 wherein the stud has a spiral cam slot in one end thereof and the receptacle has a cam follower spring thereon so that when the receptacle and stud are coupled and rotated with respect to one another the cam follower spring will follow the cam slot and will axially draw the two members together into the fastened condition.

7. The invention in accordance with claim 6 wherein the cam slot terminates in a locking detent where the spring seats upon a full quarter-turn rotation between the receptacle and stud to fully fasten the members together, and upon exertion of sufficient force the cam follower spring will unseat from the locking detend and pass from the cam slot upon a quarter-turn rotation in the opposite direction thereby freeing the stud and receptacle and permitting the two members to be separated.

8. The invention in accordance with claim 1 wherein the receptacle includes an enlarged surface area base portion having a face for engagement with the one member to be fastened thereby distributing the fastening load over a large area.

9. The invention in accordance with claim 8 wherein a pair of spaced elongated wings extend upward from the enlarged surface area base of the receptacle to form a gripping surface to facilitate rotation of the receptacle with respect to the stud.

10. The invention in accordance with claim 9 wherein the receptacle has a central opening and the cam follower spring is mounted on the base so that a portion thereof extends diametrically across the opening for engagement by the receptacle retainer and in position to be coupled with the cam slot of the stud.

11. The invention in accordance with claim 10 wherein the stud has an enlarged surface area lateral projection extending therefrom spaced from the end containing the spiral cam slot and in position to engage with the surface of the other member when the stud is mounted thereto so as to distribute the fastening load over a large area.

* * * * *